April 18, 1961 R. T. CAHILL ET AL 2,980,452
END FACE SEALING UNIT

Filed Jan. 25, 1957 2 Sheets-Sheet 1

INVENTORS.
Richard T. Cahill,
BY Edmund J. Kujawa,
Cromwell, Greist & Warden
Attys April 18, 1961 R. T. CAHILL ET AL 2,980,452
END FACE SEALING UNIT
Filed Jan. 25, 1957 2 Sheets-Sheet 2

INVENTORS
Richard T. Cahill,
BY Edmund J. Kujawa,
Cromwell, Greist & Warden
ATTYS.

United States Patent Office 2,980,452
Patented Apr. 18, 1961

2,980,452
END FACE SEALING UNIT

Richard T. Cahill, Arlington Heights, and Edmund J. Kujawa, Wilmette, Ill., assignors to Chicago Rawhide Manufacturing Company, Chicago, Ill., a corporation of Illinois Filed Jan. 25, 1957, Ser. No. 636,312

10 Claims. (Cl. 286—11)

The present invention relates generally to a new and improved form of expansible and compressible end face sealing unit which is of uncomplicated design by reason of a new and improved efficient utilization of a flexible diaphragm.

It is an object of the present invention to provide a new and improved end face sealing unit including the utilization of a new and improved form of diaphragm and diaphragm attaching arrangement which not only provides flexible diaphragm action in conjunction with expansion and compression of the relatively movable elements of the seal but also provides element supporting and positioning functioning, the diaphragm attaching elements being arranged to provide improved diaphragm functioning while protecting the same.

A further object is to provide a new and improved form of end face sealing unit utilizing combined elements each of which is of uncomplicated design and improved functioning due to the inclusion in the over-all unit of a new and improved form of diaphragm which cooperatively functions with certain of the elements to enhance the efficiency of operation of the over-all unit, the diaphragm and certain of its attaching elements being readily replaceable in the field to allow continued use of the remaining elements of the unit.

Still a further object is to provide a new and improved end face sealing unit of the expansible and compressible type having incorporated therein the foregoing improved features of design and functioning while still further being provided with improved forms of seal positioning pins adapted for mounting within a shaft housing, the pins being provided with friction means which are capable of holding the assembled seal in its operative position relative to an element of a shaft housing while the shaft housing is being completely assembled.

Other objects not specifically set forth will become apparent from the following detailed description made in conjunction with the drawings wherein.

Figure 1:
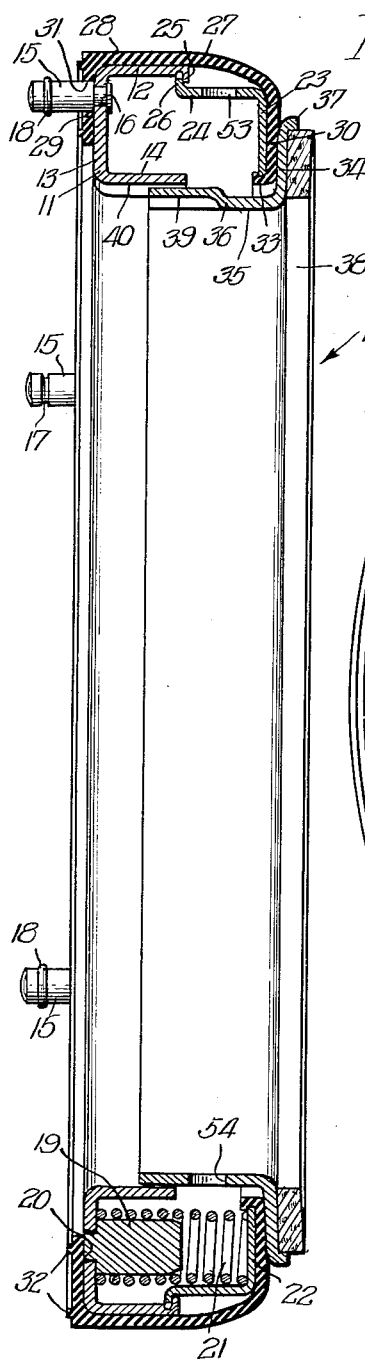
Fig. 1 is a vertical section of the improved end face sealing unit of the present invention illustrating the same in its unmounted fully extended condition.

As particularly shown in Fig. 1, the end face sealing unit 10 of the present invention includes a generally U-shaped, annular outer shell 11 opening axially and formed from an outer axially extending wall portion 12 integrally formed with the top margin of a radially extending end wall 13 which, in turn, is integrally attached along its innermost margin with an inner wall portion 14 extending axially and of approximately the same length as the outer wall portion 12. The outer shell 11 carries a series of spaced axially and rearwardly directed seal mounting or drive pins 15 having portions thereof suitably received through a series of spaced apertures 16 in the end wall 13. Each of the pins 15 is provided with an annular groove 17, all of which, if desired, may have received therein a rubber grommet 18 to provide frictional mounting action as will subsequently be described. The end wall 13 of the outer shell 11 further carries inwardly and axially directed guide pins 19 suitably mounted in spaced apertures 20, the annularly spaced guide pins 19 each having received thereabout a coil spring 21 which at one axial end abuts the inner face of the end wall 13.

The remaining axial end of each of the coil springs 21 abuts the inner surface of a radially inwardly extending portion 22 of an inner shell 23. The outermost marginal edge of the radially extending portion 22 is integrally formed with an axially inwardly extending portion 24 which is at least partially telescopically received within the outer wall portion 12 of the outer shell 11. The free marginal edge of the outer wall portion 12 of the outer shell 11 is provided with an inturned lug member 25 which, as shown in Fig. 1, is in engagement with an outwardly turned lug member 26 formed integral along the free marginal edge of the axially extending portion 24 of the inner shell 23. The outer diameter of the lug member 26 is less than the inner diameter of the outer wall portion 12 so as to freely allow telescopic movement of the inner shell 23 inwardly of the outer shell 11. Axial disengagement of the inner shell 23 with the outer shell 11 is prevented by contact between the lug members 25 and 26 as shown in Fig. 1. The inner diameter of the lug member 25 is less than the outer diameter of the lug member 26 so as to insure contact between the same upon axial movement of the inner shell 23 away from the outer shell 11 in response to the urging of the coil springs 21.

Received about the outer surfaces of the outer shell 11 and the inner shell 23 is a flexible rubber diaphragm 27 of annular arrangement. The diaphragm 27 is generally U-shaped, opening inwardly and is formed from a generally axially extending center portion 28 integral along its edge margins with spaced radially inwardly directed portions 29 and 30. The radially inwardly extending portion 29 is fixed relative to the outer surface of the end wall 13 of the outer shell 11 by the pins 15 which are suitably received through spaced aligned apertures 31. The pins 15 thus hold the diaphragm including the radially inwardly extending portion 29 in intimate contact with the outer surface of the end wall 13 and the outer surface of the outer wall portion 12. The outer surface of the radially inwardly extending portion 29 is further provided with radially spaced, circumferentially continuous sealing ribs 32 formed from the material of the diaphragm for a purpose to be described.

The radially inwardly extending portion 30 of the diaphragm 27 is in engagement with the outer surface of the radially inwardly extending portion 22 of the inner shell 23 and is fixed relative thereto by reason of being provided along its innermost free marginal edge with a circumferentially continuous, outwardly opening groove formation 33. The groove formation 33 is formed from an axially extending portion terminated by a radially outwardly extending portion of substantially J-shaped cross section defining a groove in which the free edge of the radially inwardly extending portion 22 of the inner shell 23 is intimately received.

A substantial portion of the outer surface of the radially inwardly directed portion 30 of the diaphragm 27 is fixed to the inner surface of a radially outwardly extending portion 34 of a retainer shell 35. The diaphragm portion 30 may be fixed to the retainer shell portion 34 by any suitable means and preferably by cement bonding. The innermost margin of the radially outwardly extending portion 34 of the retainer shell 35 is integral with an axially extending portion 36 which is telescopically received within the inner wall portion 14 of the outer shell 11. The outermost free marginal edge of the radially outwardly directed portion 34 of the retainer shell 35 is provided with a circumferentially continuous, axially directed rib portion 37 which partially confines an annular seal or washer 38 therein. The inner surface of the washer 38 is suitably attached, as by cementing, to the outer surface of the radially outwardly extending portion 34 of the retainer shell 35 and provides the end face sealing action to be described. It will be noted that the radially outwardly extending portion 34 is inclined slightly forwardly from the vertical to impart to the outer sealing face of the washer 38 a similar forward inclination. The purpose of this inclination is to provide proper breaking in of the washer 38 during use of the sealing unit 10 so as to establish and maintain efficient end face sealing action over an extended period of use.

Figure 2:
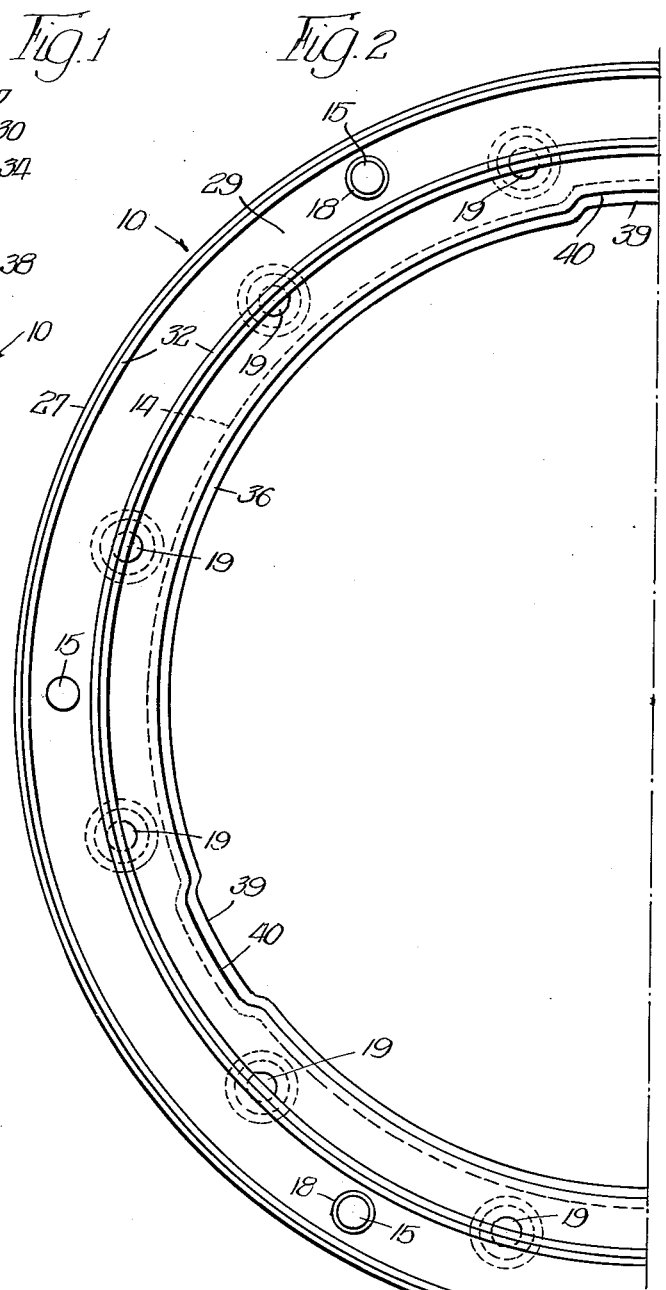
Fig. 2 is a partial rear elevation of the end face sealing unit of Fig. 1 illustrating the same as viewed toward the right in Fig. 1.

The interfitting of the diaphragm 27 with the inner shell 23 by use of the groove defining portion 33 not only results in the maintaining of proper shape of the diaphragm 27 by the supporting action of the inner shell 23, but further allows the diaphragm 27 to function to maintain the proper positioning of the inner shell 23 and support the same. It will be noted that the inner shell 23 is not provided with any special, relatively complicated means to prevent relative rotation between the same and the outer shell 11. This latter undesirable action, which might result in damage to the diaphragm 27, is prevented by the manner in which the retainer shell 35 is not only permanently fixed to the diaphragm 27 but is also interfitted with the outer shell 11. Referring to Figs. 1 and 2 it will be noted that the axially extending portion 36 of the retainer shell 35 is provided with a series of circumferentially spaced, expanded portions or locking fingers 39 which are suitably received in cooperating expanded portions or locking grooves 40 carried by the inner wall portion 14 of the outer shell 11. The interfitting of the locking fingers 39 and locking grooves 40 prevents relative rotation between the retainer shell 35 and the outer shell 11. By these single uncomplicated means, which may be readily formed without the use of expensive machinery, not only is the retainer shell 35 held against rotation but also the diaphragm 27 is prevented from being destructively twisted or distorted and the inner shell 23 is, likewise, prevented from rotating.

Thus the separate elements, each of which is of uncomplicated structure and each of which may be readily and inexpensively formed, are combined and held against relative rotation by interconnections which are readily made and do not depend upon the provision of a number of interconnecting parts, such as lugs or the like, which must be bent into position upon assembling the sealing unit. In this connection, it will be noted that the only bending operation necessary to provide a completed sealing unit is the bending of the lug member 25, the material of the same being of lighter gauge to facilitate the carrying out of this operation.

In addition to the foregoing improved structural and functional features of the cooperating diaphragm 27 and shells 11, 23 and 35, the diaphragm 27 is protected at all times against damaging contact with the springs 21 by reason of the telescopic relation of the outer shell 11 and inner shell 23. In the event of deflection of the diaphragm 27 in a radially inwardly direction, the interior of the unit wherein the springs 21 are carried is not exposed or opened in such a manner that portions of the diaphragm 27 may be forced thereinto and present the possibility of damaging contact with the springs 21. Such contact could be damaging, for example, in the event that a portion of the diaphragm 27 was pinched between the coils of a spring 21 during compression or contraction of the unit 10. In this connection it will be particularly noted that all of the surfaces of the shells 11, 23 and 35 which may possibly be placed in movable contact with portions of the diaphragm 27 are smooth by reason of having rounded surfaces. Thus, the rather substantial flexing of the diaphragm 27 due to its extensive surface area does not result in undue wear of the same upon frictional engagement with certain portions of the shells supporting the same.

The design of the elements forming the unit 10 provides an additional important function in that upon continued use of the unit 10, the diaphragm 27, retainer shell 35 and washer 38 can readily be replaced without the necessity of replacing the remaining elements of the units. As described above, the diaphragm 27, retainer shell 35 and washer 38 are attached to one another in such a manner as to provide a single unit of elements. Upon replacement of this particular portion of the seal, it is necessary merely to remove the diaphragm 27 from engagement with the pins 15 and move the retainer shell 35 axially away from the remaining elements of the seal. The groove defining portion 33 of the diaphragm 27 may be readily disengaged from the inner shell 23. The replacing of a worn sub-assembly including the diaphragm and attached elements by a new sub-assembly can be just as readily accomplished.

Figure 3:
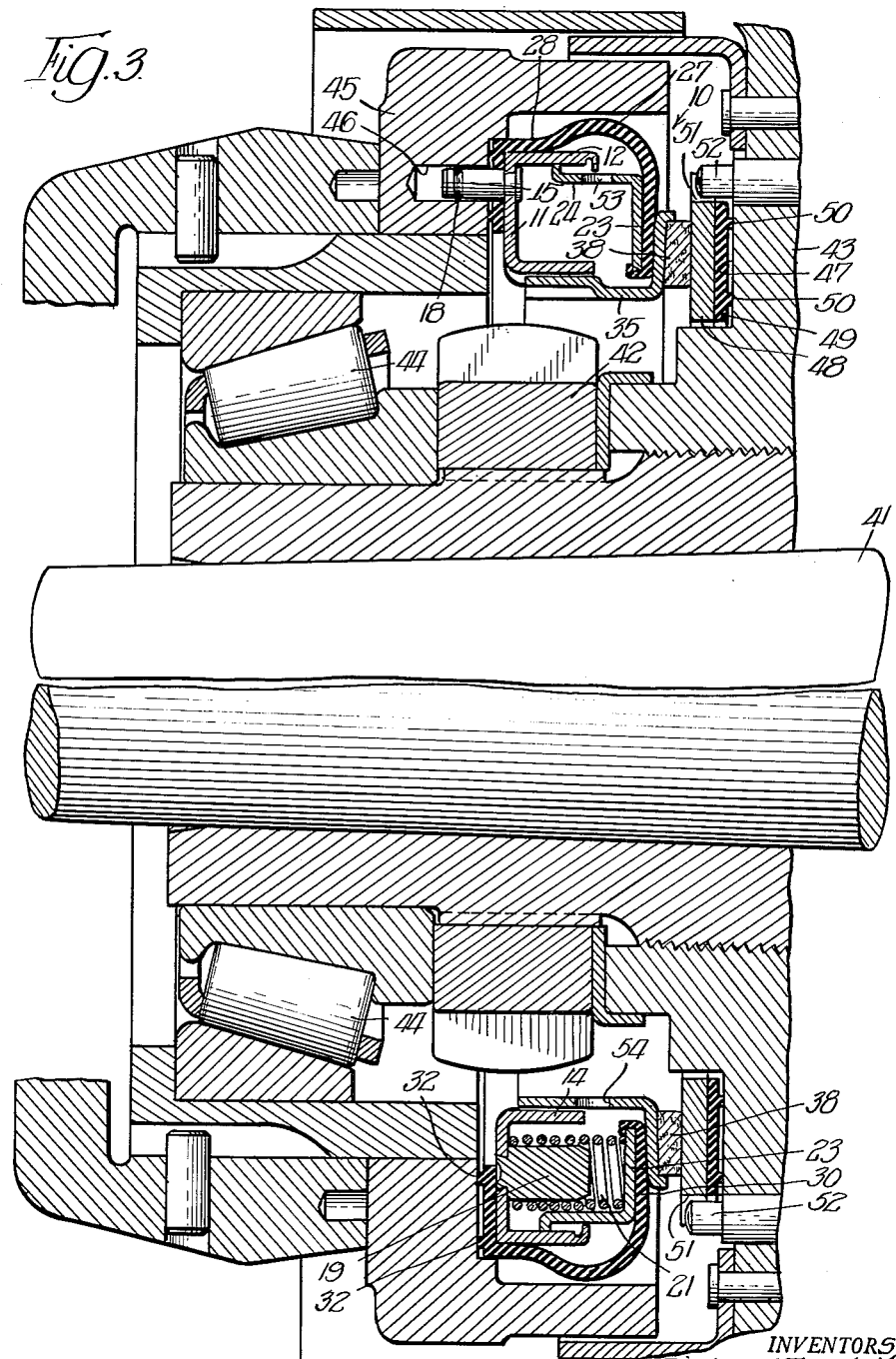
Fig. 3 is a fragmentary, partly sectioned view of a tractor drive assembly illustrating the end face sealing unit of the present invention mounted in its operative position therein.

In Fig. 3 a typical installation in a tractor drive is illustrated, the various parts and arrangements of the same being entirely conventional and, consequently, not described in any detail. For general purposes of location of the sealing unit 10 installed in its operative position, the tractor drive arrangement includes a shaft assembly 41 provided with a housing portion 43. Roller bearings 44 associated with a bearing lock nut 42 allow relative rotation between the shaft assembly 41 and a housing 45 which carries the seal 10. The housing 45 is provided with a series of circumferentially spaced apertures 46 in which the pins 15 are received. In mounting the sealing unit 10 in the tractor drive arrangement prior to complete assembly of the same, the housing 45 is exposed due to the disassembly or removal of the shaft housing 43. The sealing unit 10 is inserted within the housing 45 and the drive or mounting pins 15 are received within the apertures 46. The grommets 18 frictionally engage the inner surfaces of the apertures 46 and the friction developed is adequate to maintain the sealing unit 10 in its mounted condition until the shaft housing 43 is completely assembled. Consequently, with the use of the grommets 18 the possibility of accidental displacement of the sealing unit 10 during assembly operations is alleviated. With the mounting of the seal 10, the ribs 32 engage the radial mounting surface of the housing 45 to seal the same.

The housing member 43 is provided with an annular groove-like portion 47 in which is received a mating ring 48 of hardened metallic material. The rear surface of the mating ring 48 has cemented thereto an annular gasket 49 provided with spaced, circumferentially continuous sealing ribs 50 which contact the radial face of the groove-like portion 47 of the rotatable housing 43. The outer periphery of the combined mating ring 48 and gasket 49 is provided with spaced grooves or partial apertures 51 in which are received axially projecting pins 52 carried by the housing 43. The pins 52 hold the combined mating ring 48 and gasket 49 against rotation relative to the housing 43.

In its mounted condition the sealing unit 10 is partially compressed and the axially extending portion 24 of the inner shell 23 is substantially received within the outer shell 11. The coil springs 21 function constantly to urge the inner shell 23 axially away from the outer shell 11 and, due to the interconnection between the diaphragm 27, retainer shell 35 and the inner shell 23, the latter elements are also constantly urged toward the mating ring 48. Consequently, the washer 38 is in constant sealing engagement with the mating ring 48 during relative rotation of the same. Upon expansion and compression of the sealing unit 10 during operation of the tractor drive unit, the diaphragm will flex substantially and the degree of bowing of the axially extending portion 28 will vary substantially. In order to compensate for changes in oil pressure within the interior of the sealing unit 10, the axially extending portion 24 of the inner shell 23 is provided with a series of circumferentially spaced oil flow holes 53 which function to relieve differences in pressure between the inner surface of the diaphragm 27 and the interior of the sealing unit 10. Still further, the axially extending portion 36 of the retainer shell 35 is provided with a series of circumferentially spaced oil flow holes 53 which function to relieve differ-communication between the interior of the sealing unit 10 and the area surrounding the bearing lock nut 42. With the pressure relieving communication established by the holes 53 and 54, excessive pressures will not be exerted against any of the separate elements forming the sealing unit to an extent that either damage results or inefficient operation of the same occurs.

Obviously many modifications and variations of the invention as hereinbefore set forth may be made without departing from the spirit and scope thereof, and therefore only such limitations should be imposed as are indicated in the appended claims.

We claim:

1. An expansible and compressible end face sealing unit including an outer shell, an inner shell having a portion thereof telescopically received within said outer shell, axially aligned and radially overlapping stop means forming a part of both said outer and inner shells to prevent separation thereof, resilient means acting between said outer and inner shell to urge the inner shell axially away from the outer shell, a diaphragm externally received about portions of both said outer and inner shells and being fixed relative thereto along marginal portions of said diaphragm, said diaphragm having an axially extending portion and a radially inwardly extending portion, said radially inwardly extending portion being fixed relative to said inner shell, and a retainer shell having a portion thereof telescopically positioned relative to said outer shell and having a further portion fixed to the radially inwardly extending portion of said diaphragm, said outer and retainer shells being provided with cooperating means holding the same against rotation relative to one another.

2. An expansible and compressible end face sealing unit including an annular outer shell, an inner shell having a portion thereof telescopically received within said outer shell, axially aligned and radially overlapping stop means forming a part of both said outer and inner shells to prevent separation thereof, resilient means acting between said outer and inner shells to uge the inner shell axially away from the outer shell, an annular diaphragm externally received about portions of both said outer and inner shells and being attached thereto along marginal portions of said diaphragm, said diaphragm having an axially extending portion and a radially inwardly extending portion, said radially inwardly extending portion being attached to said inner shell, and a retainer shell having an end face sealing ring carried thereby, said retainer shell having a portion thereof telescopically positioned relative to said outer shell and having a further portion fixed to the radially inwardly extending portion of said diaphragm, said outer and retainer shells having cooperating means holding the same against rotation relative to one another.

3. An expansible and compressible end face sealing unit including an annular outer shell, an inner shell having a portion thereof telescopically received within said outer shell, axially aligned and radially overlapping stop means forming a part of both said outer and inner shells to prevent separation thereof, resilient means acting between said outer and inner shells to urge the inner shell axially away from the outer shell, an annular diaphragm externally received about portions of both said outer and inner shells and being fixed relative thereto along marginal portions of said diaphragm, said diaphragm having an axially extending portion and a radially inwardly extending portion, said radially inwardly extending portion being fixed relative to said inner shell, said inner shell being apertured for pressure relieving communication with the inner surface of said diaphragm, and a retainer shell having an end face sealing ring carried thereby, said retainer shell having a portion thereof telescopically positioned relative to said outer shell and having a further portion fixed to the radially inwardly extending portion of said diaphragm, said retainer shell being apertured for pressure relieving communication with the interior of said unit, said outer and retainer shells having cooperating means holding the same against rotation relative to one another.

4. An expansible and compressible end face sealing unit including an annular outer shell, an inner shell having a portion thereof telescopically received within said outer shell, axially aligned and radially overlapping stop means forming a part of both said outer and inner shells to prevent separation thereof, resilient means acting between said outer and inner shells to urge the inner shell axially away from the outer shell, said outer shell having spaced outer and inner wall portions which are axially directed and integrally interconnected by a radially directed end wall portion, axially and outwardly directed spaced pins carried by said end wall portion to mount the same in fixed relation to an element associated with a shaft housing and having spaced apertures in which said pins are received, at least one of said pins having a peripheral groove seating a gasket which frictionally holds said outer shell and associated sealing unit parts in mounted relation to said element during complete assembly of said shaft housing, an annular diaphragm externally received about portions of both said outer and inner shells and being fixed relative thereto along marginal portions of said diaphragm, said diaphragm having an axially extending portion and a radially inwardly extending portion, said radially inwardly extending portion being fixed relative to said inner shell, and a retainer shell having an end face sealing ring carried thereby, said retainer shell having a portion thereof telescopically positioned relative to said outer shell and having a further portion fixed to the radially inwardly extending portion of said diaphragm, said outer and retainer shells having cooperating means holding the same against rotation relative to one another.

5. An expansible and compressible end face sealing unit including an annular outer shell, said outer shell having spaced outer and inner wall portions which are axially directed and integrally interconnected by a radially directed end wall portion, axially and outwardly directed spaced pins carried by said end wall portion to mount the same in fixed relation to an element associated with a shaft housing and having spaced apertures in which said pins are received, at least one of said pins having a peripheral groove seating a gasket which frictionally holds said outer shell and associated sealing unit parts in mounted relation to said element during complete assembly of said shaft housing, an inner shell being formed from an axially extending portion integral along an edge thereof with a radially inwardly extending portion, said axially extending portion being telescopically received within the outer wall portion of said outer shell, the free marginal edges of said outer wall portion and said axially extending portion defining inwardly and outwardly directed contacting lug members respectively to prevent axial separation therebetween, resilient means acting between said outer and inner shells to urge the inner shell axially away from the outer shell, an annular diaphragm externally received about portions of both said outer and inner shells and being fixed relative thereto along marginal portions of said diaphragm, said diaphragm having an axially extending portion and a radially inwardly extending portion, said radially inwardly extending portion being fixed relative to said inner shell, and a retainer shell having an end face sealing ring carried thereby, said retainer shell having a portion thereof telescopically positioned relative to said outer shell and having a further portion fixed to the radially inwardly extending portion of said diaphragm, said outer and retainer shells having cooperating means holding the same against rotation relative to one another.

6. An expansible and compressible end face sealing unit including an annular outer shell, said outer shell having spaced outer and inner wall portions which are axially directed and integrally interconnected by a radially directed end wall portion, axially and outwardly directed spaced pins carried by said end wall portion to mount the same in fixed relation to an element associated with a shaft housing and having spaced apertures in which said pins are received, an inner shell being formed from an axially extending portion integral along an edge thereof with a radially inwardly extending portion, said axially extending portion being telescopically received within the outer wall portion of said outer shell, the free marginal edges of said outer wall portion and said axially extending portion defining inwardly and outwardly directed contacting lug members respectively to prevent axial separation therebetween, resilient means acting between said outer and inner shells to urge the inner shell axially away from the outer shell, an annular diaphragm externally received about portions of both of said outer and inner shells and being fixed relative thereto, said diaphragm being generally U-shaped in cross section and opening inwardly to define an axially extending portion integral along its margins with spaced radially inwardly extending portions, one of said radially inwardly extending portions being in contact with the outer surface of the end wall portion of said outer shell and having spaced apertures through which said pins are received, the free marginal edge of the other of said radially inwardly extending portions defining a groove in which the free marginal edge of the radially inwardly extending portion of said inner shell is received, and a retainer shell having an end face sealing ring carried thereby, said retainer shell having a portion thereof telescopically positioned relative to said outer shell and having a further portion fixed to the radially inwardly extending portion of said diaphragm associated with said inner shell, said outer and retainer shells having cooperating means holding the same against rotation relative to one another.

7. An expansible and compressible end face sealing unit including an annular outer shell, said outer shell having spaced outer and inner wall portions which are axially directed and integrally interconnected by a radially directed end wall portion, axially and outwardly directed spaced pins carried by said end wall portion to mount the same in fixed relation to an element associated with a shaft housing and having spaced apertures in which said pins are received, an inner shell being formed from an axially extending portion integral along an edge thereof with a radially inwardly extending portion, said axially extending portion being telescopically received within the outer wall portion of said outer shell, the free marginal edges of said outer wall portion and said axially extending portion defining inwardly and outwardly directed contacting lug members respectively to prevent axial separation therebetween, resilient means acting between said outer and inner shells to urge the inner shell axially away from the outer shell, an annular diaphragm externally received about portions of both said outer and inner shells and being fixed relative thereto, said diaphragm being generally U-shaped in cross section and opening inwardly to define an axially extending portion integral along its margins with spaced radially inwardly extending portions, one of said radially inwardly extending portions being in contact with the outer surface of the end wall portion of said outer shell and having spaced apertures through which said pins are received, the free marginal edge of the other of said radially inwardly extending portions defining a groove in which the free marginal edge of the radially inwardly extending portion of said inner shell is received, a retainer shell being formed from an axially extending portion integral with a radially outwardly extending portion, said axially extending portion being telescopically received within the inner wall portion of said outer shell and being provided with spaced locking fingers which are received within spaced locking grooves formed in said inner wall portion, said locking fingers and grooves preventing relative rotation between said outer shell and said retainer shell, the radially outwardly extending portion of said retainer shell being received about and fixed to the outer surface of said last named radially inwardly extending portion of said diaphragm, and a sealing ring fixed to the outer surface of the radially outwardly extending portion of said retainer shell.

8. An expansible and compressible end face sealing unit including an annular outer shell, said outer shell having spaced outer and inner wall portions which are axially directed and integrally interconnected by a radially directed end wall portion, axially and outwardly directed spaced pins carried by said end wall portion to mount the same in fixed relation to an element associated with a shaft housing and having spaced apertures in which said pins are received, at least one of said pins having a peripheral groove seating a gasket which frictionally holds said outer shell and associated sealing unit parts in mounted relation to said element during complete assembly of said shaft housing, an inner shell being formed from an axially extending portion integral along an edge thereof with a radially inwardly extending portion, said axially extending portion being telescopically received within the outer wall portion of said outer shell, the free marginal edges of said outer wall portion and said axially extending portion defining inwardly and outwardly directed contacting lug members respectively to prevent axial separation therebetween, the end wall portion of said outer shell carrying spaced inwardly directed guide pins about which are received coil springs resiliently acting between said end wall portions and the inner surface of the radially inwardly extending portion of said inner shell, an annular diaphragm externally received about portions of both said outer and inner shells and being fixed relative thereto, said diaphragm being generally U-shaped in cross section and opening inwardly to define an axially extending portion integral along its margins with spaced radially inwardly extending portions, one of said radially inwardly extending portions being in contact with the outer surface of the end wall portion of said outer shell and having spaced apertures through which said pins are received, the free marginal edge of the other of said radially inwardly extending portions defining a groove in which the free marginal edge of the radially inwardly extending portion of said inner shell is received, said inner shell being apertured for pressure relieving communication with the inner surface of said diaphragm, a retainer shell being formed from an axially extending portion integral with a radially outwardly extending portion, said axially extending portion being telescopically received within the inner wall portion of said outer shell and being provided with spaced locking fingers which are received within spaced locking grooves formed in said inner wall portion, said locking fingers and grooves preventing relative rotation between said outer shell and said retainer shell, the radially outwardly extending portion of said retainer shell being received about and fixed to the outer surface of said last named radially inwardly extending portion of said diaphragm, said retainer shell being apertured for pressure relieving communication with the interior of said unit, and a sealing ring fixed to the outer surface of the radially outwardly extending portion of said retainer shell.

9. An expansible and compressible end face sealing unit including a pair of shells which are aligned for axial movement relative to one another, resilient means acting on at least one of said shells to urge the same axially away from the other of said shells, a diaphragm extending about said shells in covering relation thereto and having opposite marginal portions fixed to said shells, the marginal portion fixed to one of said shells extending radially inwardly along a radial face of said shell and being further in engagement with a retainer shell to hold said one shell in fixed relation with said retainer shell by means of said diaphragm, said retainer shell being in engagement with said other shell to hold the various shells against relative rotation.

10. An expansible and compressible end face sealing unit including a pair of shells which are aligned for axial movement relative to one another, resilient means acting on at least one of said shells to urge the same axially away from the other of said shells, a diaphragm extending about said shells in covering relation thereto and having opposite marginal portions fixed to said shells, the marginal portion fixed to one of said shells extending radially inwardly along a radial face of said shell and being further in engagement with a retainer shell to hold said one shell in fixed relation with said retainer shell by means of said diaphragm, said retainer shell being in engagement with said other shell to hold the various shells against relative rotation, said other shell member being provided with spaced outwardly projecting drive pins, at least one of said drive pins being provided with an annularly arranged mounting gasket for friction retention of the same in a pin-receiving recess upon operative mounting of said unit.

References Cited in the file of this patent

UNITED STATES PATENTS

| | | |
|---|---|---|
| 2,301,723 | Vedovell | Nov. 10, 1942 |
| 2,311,494 | Vedovell | Feb. 16, 1943 |
| 2,341,900 | Boden | Feb. 15, 1944 |
| 2,395,359 | Vedovell | Feb. 19, 1946 |
| 2,639,170 | Schick et al. | May 19, 1953 |
| 2,660,834 | MacGlashan | Dec. 1, 1953 |
| 2,858,149 | Laser | Oct. 28, 1958 |
| 2,884,267 | Kosatka | Apr. 28, 1959 |

UNITED STATES PATENT OFFICE
CERTIFICATE OF CORRECTION

Patent No. 2,980,452                          April 18, 1961

Richard T. Cahill et al.

It is hereby certified that error appears in the above numbered patent requiring correction and that the said Letters Patent should read as corrected below.

Column 5, line 13, for "53 which function to relieve differ-" read -- 54 which provide pressure relieving --; line 53, for "uge" read -- urge --.

Signed and sealed this 31st day of October 1961.

(SEAL)
Attest:

ERNEST W. SWIDER                              DAVID L. LADD
Attesting Officer                                 Commissioner of Patents

USCOMM-DC